W. KAISLING.
CALLING DEVICE.
APPLICATION FILED NOV. 6, 1911.

1,098,447.

Patented June 2, 1914.
2 SHEETS—SHEET 1.

Witnesses:
George E. Mueller
Wm. Berghahn

Inventor:
William Kaisling
By Curtis & Beaumt
Attorney.

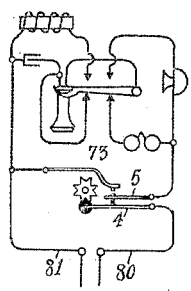

UNITED STATES PATENT OFFICE.

WILLIAM KAISLING, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

CALLING DEVICE.

1,098,447.   Specification of Letters Patent.   Patented June 2, 1914.

Application filed November 6, 1911.   Serial No. 658,715.

*To all whom it may concern:*

Be it known that I, WILLIAM KAISLING, residing in Chicago, county of Cook, and State of Illinois, have invented new and useful Improvements in Calling Devices, of which the following is a specification.

My invention relates to calling devices, and more particularly to the type of calling device used in connection with so-called metallic circuit automatic telephone systems in which a metallic circuit is interrupted a predetermined number of times by the operation of the calling device, to control the operation of selector switches, an object being to provide such a device which is simple, positive in operation and compactly arranged, certain features and advantages thereof being more particularly pointed out in the specification and appended claims.

In calling devices of the present type, when used in connection with so-called metallic circuit automatic systems in which quick and slow acting relays are operated responsive to interruptions of the metallic circuit by means of the calling device, it is an advantage to have a device so arranged that its operation can not be interfered with to cause a false signal to be transmitted. To this end I have worked out my invention in a preferred form as illustrated in the accompanying drawings in which—

Figure 3:
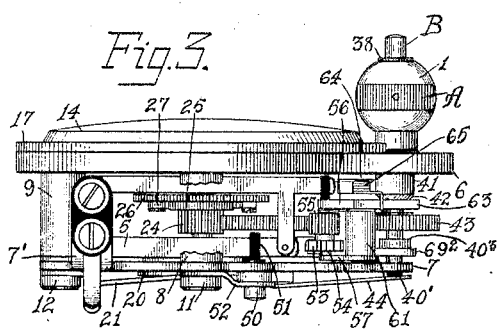
Figure 1:
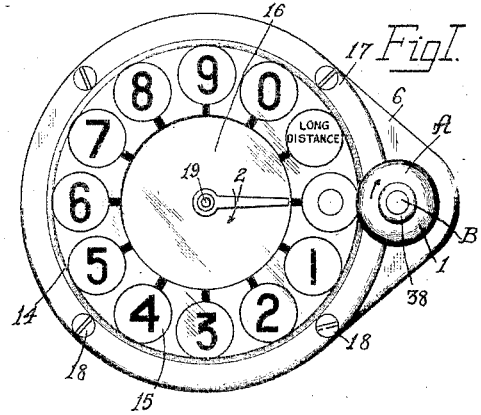
Figure 2:
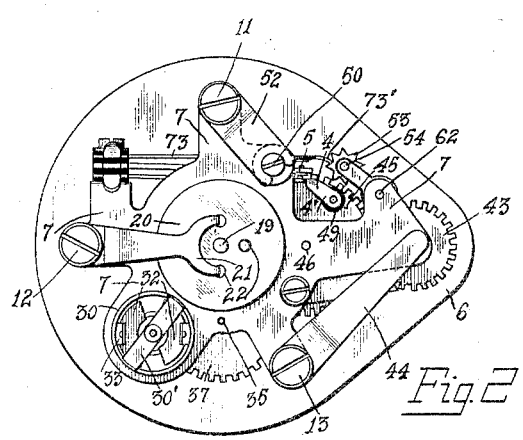
Figure 5:
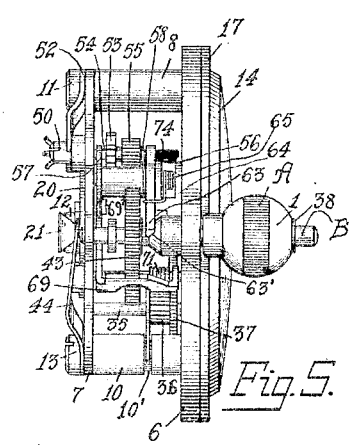
Figure 4:
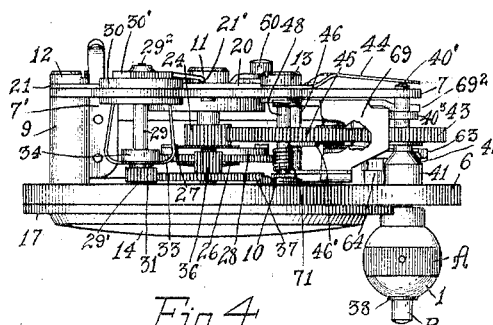
Figure 6:
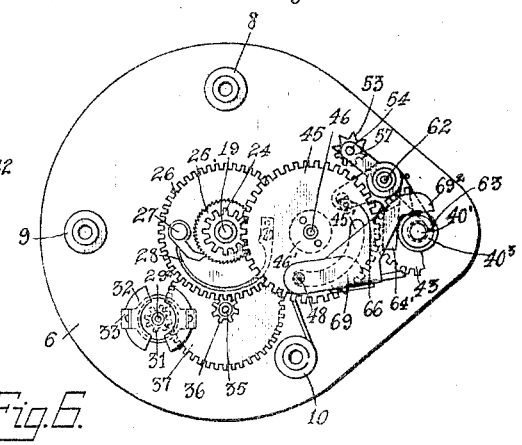

Figure 1 is a face view of a calling device embodying my invention. Fig. 2 is a rear view thereof. Fig. 3 is a view looking downward at Fig. 2. Fig. 4 is a view looking upward at Fig. 2. Fig. 5 is a right end view of Fig. 2. Fig. 6 is a rear view with the bridge plate 7 removed showing some of the interior mechanism in its normal position, the mechanism in Figs. 1 to 5 being also at normal. Fig. 7 is a view somewhat similar to Fig. 6, but with some of the parts shown off normal. Fig. 8 is a detailed view of the setting member and starting plunger at normal. Fig. 9 shows the parts of Fig. 8 in an off normal or operated position. Fig. 10 illustrates in perspective several parts which coöperate with the setting and starting member. Fig. 11 shows the main spring barrel and spring from which power is derived for operating the device after adjustment. Fig. 12 shows a locking and friction pawl which coöperates with the adjusting or setting member and certain other parts of the mechanism. Fig. 13 shows the rotatable friction members of the governor. Fig. 14 shows a method of assembling the number dial and of fastening the crystal to the face of the device for protecting the pointer and dial. Fig. 15 illustrates the spring barrel with a flat locking spring for holding the barrel in place. Fig. 16 shows the setting member moved to an intermediate position with the detent of Fig. 12 resting on the periphery of a gear tooth, causing the detent to lock the starting plunger B at normal. Fig. 17 shows a modified arrangement of the setting and starting members. Fig. 18 is a well known form of substation telephone diagrammatically illustrated and showing the preferred method of connecting the contact springs of the calling device therewith.

Generally speaking, my calling device is adapted to transmit impulses according to the adjustment of the setting member, this feature of course being common to a great many calling devices, as is well known. For instance, should it be desired to transmit nine impulses, the setting member A which is geared to the indicating pointer 2, is rotated until the pointer is opposite the indicating numeral 9, this operation causing an adjustment of the impulse mechanism corresponding to the adjustment of the setting member A. Thereafter the starting plunger B is depressed, releasing the impulse mechanism from its adjustment, whereby the impulse springs 4—5 are operated to cause nine interruptions of their contacts. Likewise should it be desired to send any other number of impulses from 1 to 10, or eleven impulses for the long distance, the pointer 2 is adjusted to the numeral corresponding with the number of impulses to be transmitted and the mechanism is thereafter released to operate.

Referring now in detail to the construction of the mechanism, it comprises a front plate 6 and a bridge plate 7 connected by means of connecting studs 8, 9 and 10 which are rigidly connected in any suitable manner to the front plate 6, and secured to bridge plate 7, preferably by means of screws 11, 12, 13. A dial is provided comprising a convex crystal 14, a number plate 15 and a backing plate 16 which are all securely clamped to front plate 6 by means of a bezel 17 through which extends four screws 18 threaded into plate 6.

A main shaft 19, has its bearing at one end in front plate 6, the other end extending into a bearing in spring barrel 20, the said barrel being fitted through a central opening in bridge plate 7, and having its shoulder bearing against plate 7 due to the pressure thereon of the holding spring 21. Said spring 21 is clamped to plate 7 by means of the screw 12 thereby holding it rigid. The bifurcated end of spring 21 as shown in Figs. 11 and 15 has two downwardly extending portions 21' which are adapted, due to the extending into openings 22 in barrel 20, to hold said barrel against rotation and also allowing for adjustment of the barrel by raising the projecting ends 21' free of barrel 20 whereby it may be rotated and the ends 21' dropped into another set of openings 22. A watch spring 23 is inclosed in the barrel 20 having one end secured to barrel 20 and the other end secured to shaft 19. A pointer 2 is securely fastened in any suitable manner to the front end of shaft 19 so that it rotates with said shaft. The number plate 15 has an opening through its center large enough to clear the end of pointer 2. Also rigidly secured to shaft 19 is a pinion 24 and a ratchet wheel 25, while loosely mounted upon said shaft 19 is a gear 26 carrying a pawl 27 which is pressed against the teeth of ratchet wheel 25 by a spring 28 which is securely fastened to the gear 26.

Governor mechanism is provided for retarding the operation of the calling device so that it may run at a predetermined speed, preferably comprising a shaft 29 journaled at its end 29' in front plate 6, while its other end $29^2$ is journaled in a cross bar 30' of friction ring 30, the said ring being rigidly secured against rotation in bridge plate 7, preferably. Governor shaft 29 carries a pair of friction blocks 32 secured to the free ends of spring member 33, which is rigidly supported between pinion 31 and collar 34 upon shaft 29. The periphery of friction blocks 32 is shaped to conform to the inner surface of friction ring 30 so that as shaft 29 is rotated, blocks 32 will tend to swing outward, as is well known, thus rubbing against the inner surface of ring 30 and retarding the movement of the device.

Intermediate gearing for connecting the main shaft 19 with the governor mechanism is provided comprising a shaft 35 having rigidly mounted thereon a pinion 36 and a gear 37, the pinion being in mesh with gear 26 carried by main shaft 19 and the gear 37 being in mesh with pinion 31 of the governor, so with this arrangement it will be seen that when gear 26 is carried around, due to the rotation of main shaft 19, it acts upon the governor mechanism through the intermediate gearing 36, 37 and 31. Shaft 35 is journaled in the plates 6, 7, being shouldered against said plates in a well known manner to prevent longitudinal movement thereof.

For adjusting the mechanism of the calling device, setting means are provided preferably in the form of setting member A comprising a knob 1 rigidly secured to a sleeve 38 which is rotatably supported in front plate 6. For securing knob 1 to the sleeve 38 a pin 39 is provided which is driven through knob 1 and sleeve 38 thereby rigidly securing them. The lower end of sleeve 38 is flanged and fitted into a counterbore in front plate 6, and the portion 1' of knob 1 is adjusted close to the face of plate 6, thereby preventing any longitudinal movement of sleeve 38 in its bearing in the plate 6. A shaft 40 extends through sleeve 38 having a collar 41 normally resting against the flange end of sleeve 38, the said collar 41 having a cam surface 42 which is adapted to act upon other parts of the mechanism as will be described. Farther down of shaft 40 a gear 43 is rigidly fastened, while the lower end 40' of shaft 40 is journaled in plate 7 extending through the plate. Shaft 40 is slotted at $40^2$ (as indicated by the dotted lines Fig. 8), pin 39 passing through said slot $40^2$ in such a manner that shaft 40 may be moved longitudinally relative to knob 1, but has no relative rotary movement, that is shaft 40 partakes of any rotary movement of knob 1. To hold starting plunger B in its normal position, as indicated in Figs. 3, 4, 5 and 8, a spring member 44 is provided, being secured at one end by screw 13 and having its free end resting under tension upon the end 40' of the plunger shaft, so that when it is pressed inwardly it acts against the tension of spring 44 which serves to restore the plunger after operation.

An intermediate gear 45 is provided for connecting the setting member A with the main or indicator shaft 19, this gear 45 also being preferably arranged to act directly upon the star wheel 53 which actuates impulse springs 4, 5. Said gear 45 is securely fastened to shaft 46, being preferably pinned to a collar 46' on said shaft, the shaft being journaled in plates 6, 7, and shouldered at each end in a well known manner to prevent longitudinal movement thereof.

From the previous description it will be seen how shaft 19 is connected with the setting member A through the medium of gears 24, 45 and 43. A shaft 48 extends through a slot 45' in gear 45, the said shaft and slot being normally in engagement and thus acting as a stop for the gearing.

A pair of impulse springs 4, 5 are insulatingly mounted upon a bracket 7', preferably integral with plate 7, being bent at right angles thereto to carry said springs. The free end of spring 4 has a pair of ears 4' pivotally supporting a roller 49 preferably of some insulating material such as hard rubber or fiber.

Adjusting means for contact springs 4, 5 are provided comprising a shouldered stud 50 extending through plate 7, and having an eccentrically disposed insulating stud 51 extending therefrom and engaging contact spring 5, the said spring resting under tension against the stud 51. A holding spring 52 is securely clamped by means of screw 11, said spring 52 having a slotted end resting on stud 50, thereby frictionally holding stud 50 against plate 7. Stud 50 is slotted at one end for the insertion of a screw driver whereby the stud may be rotated and due to the eccentric movement imparted to its insulating stud 51, it will be seen that spring 5 may be adjusted thereby.

For operating impulse springs 4, 5, a rotatable star wheel 53 is provided, securely fastened to a pinion 55, said wheel and pinion being free upon shaft 54. The shaft 54 is rigidly supported by arms 56, 57 being preferably driven through the holes in the ends of said arms and staked therein. With the pinion 55 and impulse wheel 53 in their normal position, that is, free from operative relation with the gearing, to prevent their being readily rotated upon their shaft from any jar of the mechanism, a friction spring 58 is provided, being adapted to press against the side of pinion 55, thus frictionally holding it in place. As is indicated more clearly in Figs. 2 and 6 of the drawings, impulse wheel 53 and pinion 55 are held normally out of operative relation with their respective coöperating parts, roller 49 and gearing 45 respectively.

As previously referred to, the contact spring actuating wheel 53 and its pinion 55 are normally out of operative relation with their actuating gear 45 so that means are provided for throwing pinion 55 into engagement with gear 45, preferably by a pivoted member 60 comprising a sleeve 61 rigidly supporting the arms 56, 57 and the flat tension spring 58 which is clamped between its sleeve 61 and arm 56. A shaft 62 extends through sleeve 61 having shouldered ends supported in plates 6, 7, the member 60 being free to rotate on said shaft 62. A finger 63, preferably integral with arm 56, has a beveled side 63' which is adapted to coöperate with the cam 42 of the starting plunger B. A locking member 64 is also pivotally supported by shaft 62, said member 64 having a slot 64² in which a coil spring 65 is disposed about shaft 62, one end of said spring extending upward against the side of finger 63, the other end of spring 65 laterally pressing against a vertical wall of slot 64' in such a manner that its tendency is to rotate members 60, 64 in the direction of the arrows indicated thereon in Fig. 10, but due to suitable stops they are normally held against rotation. Normally finger 63 rests in engagement with cam 42 as indicated in Fig. 8, finger 63 being shown in cross section, the spring 65, pressing said finger 63 against said cam 42.

When the starting plunger B is depressed, cam 42 acts upon finger 63 moving it outward to the position indicated in Figs. 7 and 9, whereby member 60 is rotated on its pivot and impulse wheel 53 and pinion 55 are moved into operative relation with roller 49 and gear 45 respectively. With the calling device in its normal position plunger B is free to be moved in and out, thereby acting upon the member 60, but this does not affect the impulse mechanism, that is, does not cause any operation thereof unless it has first been adjusted by the setting member A as will be more fully described.

In order to prevent interference with the device after setting member A has been adjusted and the starting member B operated to release the mechanism, the arm 64' of locking member 64 is adapted to be moved on its pivot to engage the shoulder 41' as indicated in Fig. 9, thereby locking plunger B in its operated position until the device restores. In Figs. 7 and 9 the mechanism is shown off normal with the starting plunger in its actuated position and arm 64' in locking engagement with the collar 41. Normally, that is with the mechanism in an unoperated position, locking member 64 is held free of collar 41, due to pin 66 which is securely fastened to gear 45, engaging the pin 67 in locking member 64, whereby member 64 is held as indicated in the figures showing the mechanism at normal. So that if the setting member A is rotated thereby rotating gear 45, pin 66 moves away from pin 67, whereby spring 65 tends to rotate locking member 64 on its pivot, but with the starting plunger at normal this is prevented as arm 64' is simply pressed against the periphery of collar 41 until the starting plunger is depressed. Of course as soon as the starting plunger is depressed after the gear 45 has been moved off normal, locking arm 64' is moved by spring 65 into locking engagement with the starting plunger as indicated in Figs. 9, 7.

In order to hold the mechanism in an adjusted position, that is, after it has been adjusted by setting member A, a holding detent 69 is provided which is held in frictional engagement with the teeth of gear wheel 43. Detent 69 is pivotally supported by shaft 48 preferably in the form of a screw stud threaded at its lower end and also directly below its slotted head, so that said shaft may be threaded into plates 6, 7. As previously referred to, shaft 48 extends through slot 45' in gear 45 acting as a stop for the gearing. A spring 71 is coiled around the shaft 48, one end engaging detent 69 and the other end resting in a slot 10' of stud 10 as indicated in Fig. 5, its tendency being to press the beveled tooth 669' against gear 43. Due to the beveled shape of tooth 69', setting member A may be rotated forward thereby moving pointer 2 to any desired position, and the setting member A may be thereafter rotated backward, detent 69 holding it in any of its operative positions.

I have preferably proportioned the gears 24 and 43, with twice the number of teeth in gear 43 as in gear 24, so that when setting member A is rotated the angular advance of gear 24 is twice the angular advance of gear 43. In other words, rotating setting member A one quarter of a revolution, causes a half revolution of gear 24 and pointer 2, which is thus moved to the indicating numeral 6. I have preferably proportioned the gears in the manner stated, so adjustment of the pointer or indicator 2 may be secured by comparatively small movement or rotation of setting member A; although it is to be understood that other proportions may be used as desired. It is to be further observed that I have provided the same number of teeth in gear 24 as there are divisions in the number dial, that is twelve teeth to twelve divisions of the dial, so that in order to move the pointer 2 to indicating numeral 3 for instance three teeth of gear 43 and of course it will follow also three teeth of intermediate gear 45, would be moved past a given point, and would be held in this adjustment due to the frictional engagement between holding detent 69 and gear 43. It will be also observed that impulse wheel 53 and pinion 55 have the same number of teeth, and as we have assumed a condition where pointer 3 was moved to numbeer 3, whereby three teeth of gear 45 were advanced, by now actuating starting plunger B, it will be seen that pinion 55 and impulse wheel 53 are first moved into engagement with their respective coöperating members gear 45 and roller 49, and thereafter the mechanism being released due to the dis-engagement of gears 43 and 45, gears 45 and 24 return to normal undeer influence of spring 23, thereby advancing pinion 55 three teeth and also impulse wheel 53 the same number of teeth whereby the contacts 4, 5 are interrupted three times.

In order to prevent an operator from actuating the setting member A to a point where indicator 2 would be between two of the indicating numbers and then releasing the mechanism, a locking finger 69², preferably extending from holding detent 69, is adapted to coöperate with collar 40³ in such a manner that the starting plunger can not be depressed except with the mechanism in one of its operating positions, that is with pointer 2 opposite one of the indicator numerals. To effect this, finger 69² is preferably so arranged with respect to the diameter of collar 40³ that when tooth 69' of the holding detent 69 is resting between two teeth of gear 43 as is clearly shown in Fig. 6, the starting plunger may be freely longitudinally reciprocated. But when the setting member A is moved for instance the space of half a tooth of gear 43, the tooth 69' of holding detent 69 rests upon the periphery of a tooth of gear 43 and therefore finger 69² is in a position beneath collar 40³, as indicated in Fig. 16, thereby preventing depression of the starting plunger while the mechanism is in such an intermediate operating position. And as gear 43 is advanced one tooth for each advancement of pointer 2 and gear 45 from one operative position to the next, it will be seen that the plunger may be reciprocated only when the mechanism is adjusted to any of its operating positions.

It is also to be observed that should the operator depress the starting plunger part way, the periphery of collar 40³ will be adjacent surface 69³ and therefore as is indicated in Fig. 6, it will be impossible to rotate the setting member A due to the tooth 69' resting between two teeth of gear 43 preventing any reciprocating or pivoting movement of member 69, which of course is necessary in order to allow the free rotation of setting member A.

When using a calling device in connection with a substation telephone of an automatic telephone system, and especially in connection with systems of the metallic line type in which interruptions of the line circuit are effected by the calling device to control the central office apparatus, it is desirable to cut out the substation apparatus thereby reducing the resistance of the line circuit and giving a more efficient and positive operation of the central office apparatus as is well known. In order to accomplish this I have arranged a shunt contact spring 73 which is adapted to be operated, and held operated, during the operation of the calling device in transmitting impulses. It will be remembered that in the operation of the device setting member A is first adjusted and thereafter the starting plunger is depressed and locked in its depressed position until the impulse mechanism has restored, thereby holding pivoted member 61 in an off normal position also until the restoration of the mechanism. Therefore, I have preferably attached an insulating sleeve 74 to an extension of shaft 54 of the impulse wheel, the said sleeve 74 being adapted to engage an extension 73' on shunt spring 73 when the pivoted member is rotated by the action of starting plunger cam 42, contact spring 73 thereby engaging the contact spring 5 and being held thus until the mechanism is restored.

In the modification illustrated in Fig. 17, the setting knob 1³ is rigidly secured to the plunger shaft 40 so that both the shaft and knob partake of both rotary and longitudinal movement. Thus in the operation of the device when using the setting and starting member as illustrated in Fig. 16, the adjusting knob is first rotated to adjust the pointer and impulse mechanism and thereafter it is depressed to release the mechanism from its adjusted position.

Referring now to Fig. 18, a well known form of substation is diagrammatically illustrated, comprising the usual switch hook and receiver, call bell, condenser, impedance coil and transmitter, and showing one method of connecting the calling device. Impulse springs 4—5 are preferably connected in series with the talking conductors 80, 81 and shunt spring 73 is connected to conductor 81 so that when contacts 73—5 are closed the substation apparatus is shunted, thereby reducing the line resistance and also precluding the possibility of the subscriber interfering with the transmission of the impulses by replacing his receiver. As during the operation of the impulse springs 4—5 contact 5—73 is closed, any operation of the switch hook contacts does not affect the proper operation of the impulse springs or transmission of impulses.

Operation: Having described in general the construction of the device and coöperation between different coöperating elements, the narrative of operation of the device will now be given. Assuming that the operator desired to effect six operations of the impulse springs 4—5, setting member A is rotated in the direction of the arrow indicated thereon in Fig. 1, thereby rotating gears 43—45 and 24 in the direction of the arrows indicated thereon in Fig. 7 until pointer 2 is opposite the indicator numeral 6, this operation meaning that each of the gears have been advanced six teeth or to the sixth operating position of the mechanism. This operation of course was against the tension of spring 23, and furthermore due to the ratchet arrangement connecting gears 26 and 24, this setting operation of the device does not cause a rotation of gear 26, as ratchet wheel 25 simply rides past pawl 27, thus allowing the forward setting movement of the device without it being retarded by the action of the governor. As the setting member is being operated, due to the holding detent 69 frictionally engaging the teeth of gear 43, the mechanism is of course held in its adjusted position.

Assuming now that the operator had moved the pointer too far, that is, to indicating numeral 9 for instance, it may be readily moved back to indicating numeral 6 by simply rotating setting member A in the reverse direction as tooth 69′ of the holding detent 69 is so shaped that setting member A may be rotated in either direction as previously referred to.

As setting member A moves off normal in the setting operation as just described, pin 66 carried by gear 45 moves away from pin 67 of locking member 64, whereby spring 65 acts upon said member 64 pressing its locking arm 64′ against the periphery of collar 41 so it is free to be moved into locking engagement when the starting plunger is depressed as will be described.

The operator having adjusted the impulse mechanism to its sixth operating position, thereafter depresses starting member B. As the starting plunger is moving downward, cam 42 acts upon finger 63 moving it outward and thereby rotating member 60 on its pivot and causing impulse wheel 53 and pinion 55 to move into operative relation with the impulse spring roller 49 and gear 45, respectively. As starting member reaches its fully depressed position, which is when wheel 53 and pinion 55 operatively engage their coöperating elements as stated, locking arm 64′ is moved by spring 65 into locking engagement with the starting member, as illustrated in Figs. 9, 7. Simultaneously, or substantially so, with the locking movement of arm 64′, gear 43 is freed from gear 45 as is indicated in Fig. 9 whereby the impulse mechanism is released for operation. The movement of pivoted member 60 also causes insulating sleeve 74 to engage shunt spring 73 moving it into engagement with contact 5.

It will be observed that while setting member A is being rotated and indicator 2 in an intermediate position, that is in a position between any two of the indicating numerals the starting plunger can not be depressed, due to the coöperation between finger 69² of holding detent 69 and collar 40³, this being brought about as follows: When the pointer 2 is at any intermediate position as stated, tooth 69′ is resting upon the peripheral surface of a tooth of gear 43 whereby finger 69² is in a position below collar 40³ as indicated in Figs. 7 and 16, thus preventing the starting plunger from being depressed except when tooth 69′ is resting between two teeth of gear 43, which means that pointer 2 and the impulse mechanism must be in an operating position.

Returning now to the point where the impulse mechanism was released for operation, spring 23 acts upon shaft 19 and thereby effects the restoration of gear 45, and the indicator 2. Due to the connection from shaft 19 through gears 26, 36, 37 and 31 to the governor mechanism, this restoring movement is retarded to a predetermined speed.

Gear 45 having been advanced six teeth in the setting operation of the device as described, upon its return it advances and rotates pinion 55 and impulse wheel 53 six teeth, the teeth of wheel 53 acting upon and reciprocating roller 49, causing six interruptions or operations of contact springs 4—5. The engagement of the end of slot 45' with shaft 70 brings the mechanism to a stop. As the gear 45 is nearing normal, pin 66 carried thereby engages pin 67, rotating member 64 on its pivot and moving locking arms 64' out of locking engagement with the starting member B which is now restored by the action of spring 44.

As the starting plunger moves toward normal after being released, gear 43 moves into mesh with gear 45, and cam 42 also moving upward, finger 63 is moved inward by the action of spring 65 thereby rotating member 61 on its pivot and moving impulse wheel 53 and pinion 55 out of operative relation with their coöperating parts, the insulating bushing 74 being also carried by pivoted member 61 and moves outward allowing shunt spring 73 to disengage itself from contact spring 5. The mechanism of the calling device is now at normal and available to be operated again to cause another series of operations of the impulse springs.

While I have worked out my invention in a specific manner and embodied it in a commercial device, it is to be understood that many changes and modifications thereof may be made and I do not desire to be limited to the exact structure as illustrated, but aim to cover all those changes and modifications as come within the spirit and scope of the appended claims.

What I desire to secure as new by United States Letters Patent is:

1. A calling device comprising a setting member, impulse mechanism adapted to be adjusted responsive to movement of said member, an indicating dial, mechanism operatively connecting said dial with said setting member for indicating the adjustment of said mechanism, and a starting member adapted to be operated after adjustment for releasing said impulse mechanism for a transmitting operation thereof.

2. A calling device comprising impulse mechanism, a setting member for adjusting said mechanism, a dial responsive to said mechanism for indicating the adjustment thereof, and a starting member for thereafter releasing said mechanism from its adjustment for a transmitting operation thereof.

3. A calling device comprising impulse mechanism, a setting member for adjusting said mechanism, an indicator geared to said mechanism, and responsive thereto for indicating the adjustment of said mechanism, and means for thereafter releasing said mechanism for operation.

4. A calling device comprising impulse mechanism, a setting member for adjusting said mechanism, an indicating dial operated responsive to an adjusting operation of said mechanism for indicating its adjustment, and means for releasing said impulse mechanism from its adjustment for operation.

5. A calling device comprising an indicating dial, impulse mechanism operatively connected with said dial, a rotatable setting member for said impulse mechanism having a rotatable adjusting shaft positioned to one side of said dial whereby the operation of said dial may be clearly observed while said setting member is being operated, and a starting member axially alined with said shaft.

6. A calling device comprising impulse mechanism, a setting member for adjusting said mechanism, an indicating dial responsive to said mechanism for indicating the adjustment thereof and a starting plunger independently movable of a setting movement of said setting member, for thereafter releasing said mechanism from its adjustment for a transmitting operation thereof.

7. A calling device comprising impulse mechanism, setting means for adjusting said mechanism, an indicating dial responsive to said mechanism for indicating the adjustment thereof, and means for operatively disconnecting said setting means from said mechanism after its adjustment whereby said mechanism is released for operation.

8. A calling device comprising impulse mechanism, a setting member for the adjustment thereof, and an indicating dial all operatively associated whereby said dial operates responsive to said mechanism when adjusted by said member, and means for operatively disassociating said setting member, and said mechanism and dial, whereby said dial and mechanism are restored for operation.

9. A calling device comprising impulse mechanism, a setting member for adjusting said mechanism, an indicating dial operated responsive to said mechanism for indicating its adjustment, and means for disconnecting said setting member from said impulse mechanism and dial whereby they are restored for operation.

10. A calling device comprising impulse mechanism having a plurality of operating positions, a setting member for adjusting said mechanism to its different positions, an indicating dial operated responsive to the adjusting movement of said mechanism for indicating the adjustment thereof, and a starting member for thereafter releasing said mechanism whereby it operates according to its adjustment.

11. A calling device comprising impulse mechanism having a plurality of operating positions, a setting member for adjusting said mechanism to its different positions, a separate manually operable member for releasing said mechanism for operation when moved to any of its operating positions, and means to prevent the release of said mechanism when moved to an intermediate position.

12. A calling device comprising impulse mechanism having a plurality of operating positions, a starting plunger for releasing said mechanism for operation when moved to any of its operating positions, and means to prevent operating said starting plunger when said mechanism is in an intermediate position.

13. A calling device comprising impulse mechanism having a plurality of operating positions, a setting member for adjusting said mechanism to its different positions, an indicating dial operated responsive to a setting movement of said mechanism for indicating the adjustment thereof, means for releasing said mechanism for operation when moved to any of its operating positions, and means to prevent the release of said mechanism when moved to an intermediate position.

14. A calling device comprising impulse mechanism having a plurality of operating positions, means for adjusting said mechanism to its different positions, an indicating dial operated responsive to a setting movement of said mechanism for indicating the adjustment thereof, a starting plunger for releasing said mechanism for operation when moved to any of its operating positions, and means to prevent operating said starting plunger when said mechanism is in an intermediate position.

15. A calling device comprising impulse mechanism having a plurality of operating positions, a setting member for adjusting said mechanism to any of said positions, a manually operated member for starting said mechanism when moved to any of its operating positions and means for rendering the device inert after adjustment until said starting member is operated.

16. A calling device comprising impulse mechanism, a spring motor for driving said mechanism, a spring barrel rotatably supported to inclose the motor spring, an elongated spring member suitably attached at one end and having its free end engaging and holding said spring barrel against rotation, said spring member being adapted to be lifted free of said spring barrel to allow rotation of same for adjusting the tension of the motor spring.

17. A calling device comprising impulse mechanism, a rotatable setting knob for adjusting said impulse mechanism, a transversely operated plunger member extending through the center of said adjusting knob, and means responsive to a transverse operation of said plunger member for releasing said impulse mechanism from its adjustment for operation.

18. A calling device comprising a setting member, impulse mechanism adapted to be adjusted responsive to the movement of said member, a numbered dial face, a dial indicator responsive to said setting member for indicating on the dial face the adjustment of said mechanism, and a starting member operated after the adjustment is completed for releasing said impulse mechanism for a transmitting operation thereof.

19. A calling device comprising impulse mechanism having a plurality of operating positions, a manually operated setting member for adjusting said mechanism to any of said positions, means for maintaining said mechanism in its operated position after the operator has released his hold upon the setting member, and a manually operated starting member adapted to be operated for releasing said mechanism for a transmitting operation thereof when moved to any of its operating positions.

Signed by me at Chicago, county of Cook, and State of Illinois, in the presence of two witnesses.

WILLIAM KAISLING.

Witnesses:
GEORGE E. MUELLER,
CARRIE E. ANDERSON.